Patented Sept. 2, 1952

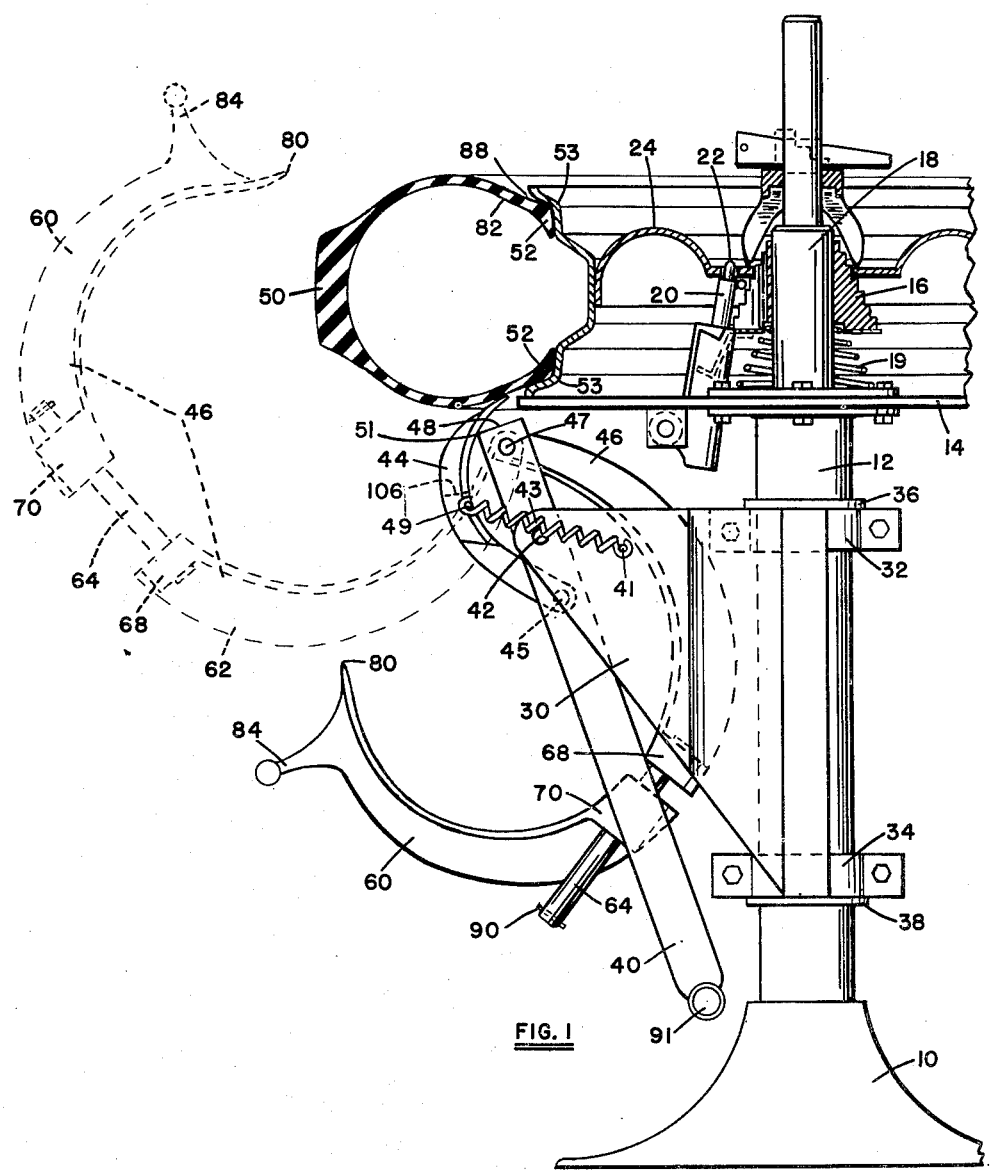

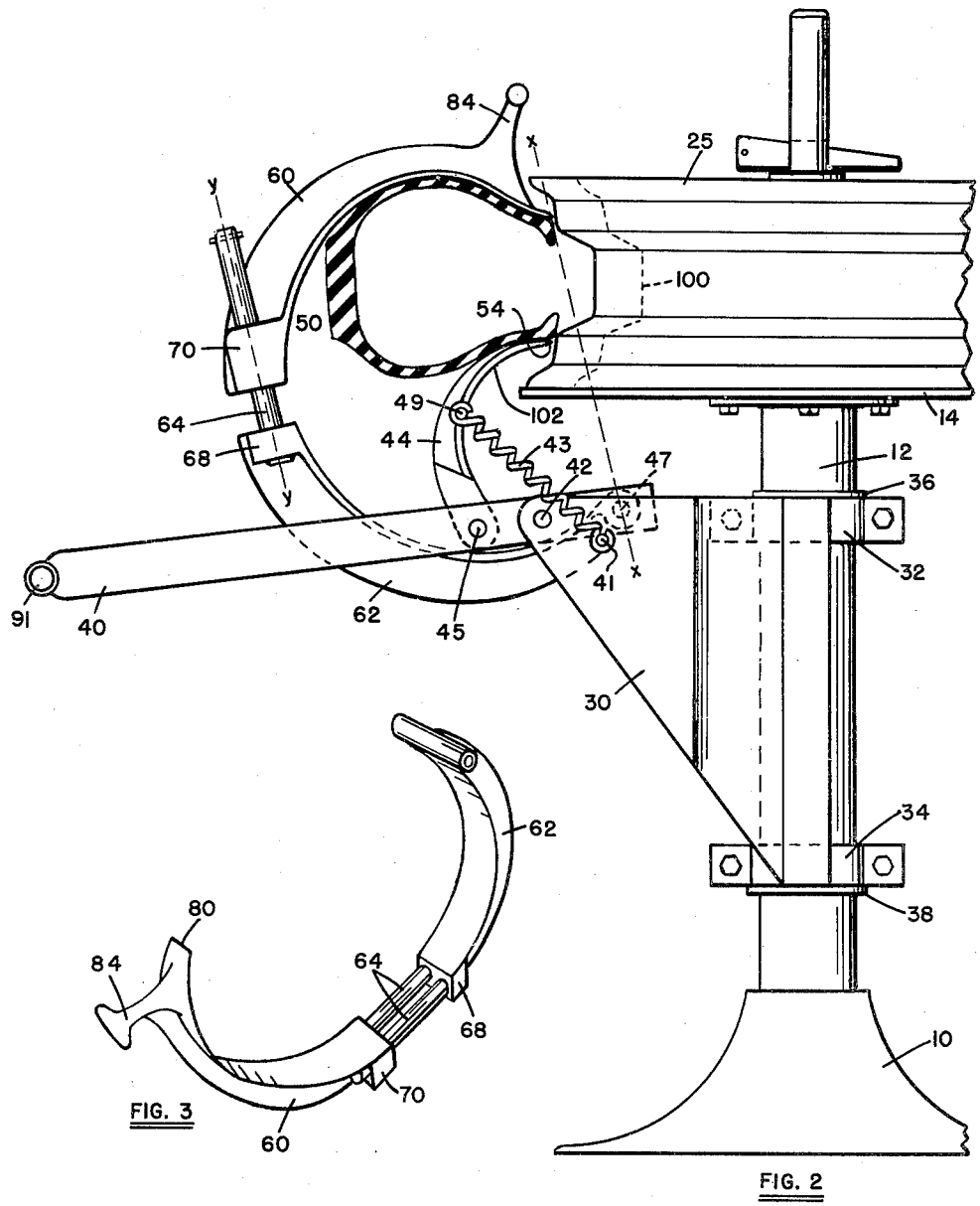

2,609,038

UNITED STATES PATENT OFFICE 2,609,038

AXIALLY COMPRESSING TYPE TIRE REMOVING APPARATUS

Robert D. Henderson, Cincinnati, Ohio

Application May 10, 1948, Serial No. 26,222

4 Claims. (Cl. 157—1.24)

This invention relates to tire handling equipment and more particularly to a device for loosening, or breaking the bead portions of a pneumatic tire casing from the bead receiving flange of a tire rim upon which the tire is mounted.

An object of the invention is to provide a device which will simultaneously break both beads of a tire casing mounted on so-called "drop center" rims.

Another object of the invention is to provide a bead breaker device which includes a pair of jaws one for and engageable with each bead, wherein one of said jaws is extensible in the sense that its overall reach may be varied to accommodate rims and tires of varying sizes, thicknesses, widths and diameters.

A further object of the invention is to provide an extensible jaw having the hereinabove described characteristics which is constructed in such a manner as to be automatically locked at any desired reach or position between upper and lower limits incident to the application of a turning moment thereto.

A further object of the invention is to provide a bead breaker device having an extensible two-piece jaw adapted to hang in a non-interfering manner below with reference to a wheel supporting surface, said jaw being swingable upwardly over and around the casing of a tire mounted on the rim of a wheel positioned on said wheel supporting surface.

Another object of the invention is to provide a bead breaker having a pair of jaws, one for each bead of a tire, wherein the operating characteristics of said jaws are synchronized whereby to simultaneously engage both beads of a tire, said jaws adapted to follow the inner contour of the bead receiving flange of the tire rim upon which the tire is mounted, for prying the tire beads from the rim, thereby facilitating the removal of tires, the beads of which have become rusted or fused onto the rims, without mutilating or otherwise damaging the tire.

Another object of the invention is to provide a bead breaker adapted for use with pneumatic tires of the type which utilize standard tubes, or heavy-duty puncture-proof tubes, as well as with the new tubeless tires.

Still another object of the invention is to provide a device having the hereinabove described characteristics wherein the jaws are so proportioned and dimensioned whereby to engage a substantial area of the side walls of a tire casing adjacent the bead thereby providing adequate and ample space between the casing and wheel rim for accommodating a suitable tire tool inserted therebetween for prying the loosened bead over the outer flange of the rim.

A further object of the invention is to provide a bead breaking device wherein the actuating lever and the bead engaging jaws are so constructed and arranged as to provide for maximum efficiency of the device with a minimum of effort on the part of an operator.

These and other objects are attained by the means described herein and as disclosed in the accompanying drawings, in which Fig. 1 is a side view of a tire handling device embodying the teachings of the present invention with certain parts cut away for clarity of detail and understanding.

Fig. 2 is a view similar to Fig. 1 but showing the device in the process of simultaneously breaking the upper and lower beads of a tire.

Fig. 3 is a perspective view of the extensible jaw comprising a detail of the present invention.

With reference to Fig. 1, it will be noted that the instant tire handling device may include a base or pedestal 10, a support column 12 and a wheel supporting table 14, the diameter of which is preferably of a dimension at least as great as the diameter of the largest wheel to be serviced by the device.

Suitable means may be provided for centering and locking a wheel to the wheel supporting table 14. If desired, such means may comprise a stepped cone 16 constructed and arranged to slideably engage shaft 18. A spring 19 normally urges cone 16 upwardly for locating and seating the central opening of plate 24 of wheel 25 in a corresponding step of the cone thereby automatically compensating for wheels of varying widths.

If desired, means for locking the wheel against rotation may be provided such as a spring loaded pin 20 terminating in a rounded upper or free end 22 and adapted to selectively engage one of the bolt holes provided in spaced relationship with the central opening of plate 24 of a wheel.

The particular structural details of the stepped cone and locating pin are more fully described in my co-pending patent application Serial No. 746,273, filed on May 6, 1947, now Patent No. 2,481,926.

It should be understood that the means disclosed in Fig. 1 for centering and locking a wheel relative to support plate 14 is exemplary in nature rather than restrictive, and that any other suitable means may be used to accomplish the desired end.

A support member 30 may be suitably journaled for rotation about the longitudinal axis of column 12 such as by means of collars 32 and 34 which are located intermediate spaced abutments 36 and 38. An actuating lever 40 is pivoted intermediate its length as at 42 to support 30, it being understood that said lever may be supported between a pair of similar, laterally spaced members 30.

A pair of jaws denoted generally by the numerals 44 and 46 are pivotally secured to lever 40, jaw 44 being secured to the lever as at 45 on that side of pivotal connection 42 remote from end 48 of the lever; jaw 46 being pivotally secured as at 47 to the lever intermediate pivot 42 and end 48.

Jaw 44 is constructed and arranged in such a manner as to engage the lower side wall of the casing of a tire 50 having beads 52 seated within rim flange 53 of a wheel 25 mounted on support 14. The contour and physical characteristics of jaw 44 are such that the tip end 54 is normally and yieldingly urged inwardly, that is toward the axis of column 12, by means of a spring 43, whereby the tip of said jaw will normally seek and engage the contour of lower flange 53 of the wheel as lever 40 is moved in a clockwise direction about pivot 42. In this manner the forward portion of the jaw will actually pry the bead from the rim thereby preventing damage to the bead incident to its separation from the rim.

In the preferred embodiment of the invention, one end of spring 43 may be attached to a pin 41 secured to and carried by support 30 and the other end attached to a pin 49 secured to and carried by jaw 44. When these pins are arranged so that a straight line drawn between them will intersect lever pivot 42 when lever 40 is in the fully lowered or retracted position illustrated in Fig. 1, spring 43 will effectively maintain the lever in its retracted position by reason of the connection of jaw 44 with the lever at 45.

As clearly illustrated in Fig. 1, the upper free end of the actuating lever will contact jaw 44 as at 51, thereby moving said jaw outwardly away from support 14 and against the counterforce of spring 43, thereby effectively precluding contact with said support.

Jaw 46 comprises two sections 60 and 62 which are slideably and adjustably interconnected for varying the reach of the jaw. In the preferred embodiment of the invention, I attain the desired adjustability of jaw 46 by means of one or more guide members 64 secured to one of said sections and upon which the other of said sections is slideably mounted. In the drawings I have represented the guide members as a pair of laterally spaced rods secured to and carried by section 62. These guide members may threadably engage or may be welded to or otherwise suitably and permanently anchored relative to section 62 which may be provided with an enlarged boss 68 for this purpose.

Section 60 may be provided with a pair of guide member receptive apertures dimensioned for sliding fit with the guide members; and in order to provide an automatic locking of section 60 relative to section 62 incident to the application of a turning moment between said sections the length dimention of the apertures, as defined by the overall length of boss 70 is preferably of a dimension ranging from 1 to 3 times the diameter of guide member 64.

Section 60 terminates at its free outer end in tip 80 which is adapted to be inserted in or at the juncture 88 where flange 53 of the rim meets side walls 82 of the tire (Fig. 1). The end of this jaw, as with jaw 44 is dimensioned for insertion between bead 52 and the inner face of the rim for prying the bead from the rim.

A hand grip portion 84 may be provided on section 60 to facilitate ease of handling and manipulation of jaw 46.

With reference now to Fig. 1, it will be observed that jaws 44 and 46 are normally adapted to be disposed in an out-of-the-way non-interfering condition with a wheel mounted on support 14.

When it is desired to utilize the device for breaking or loosening the beads of the casing of a tire mounted in flanges 53 of the wheel, handle 84 may be grasped for permitting section 60 to be slid outwardly to a fully extended position with reference to section 62 thereby providing a maximum reach of jaw 46. The extended jaw may then be swung upwardly as indicated by the broken lines of Fig. 1 around and over tire 50 for locating tip 80 in juncture 88, during which time section 60 may be slid inwardly on and with reference to guide members 64 for automatically adjusting the overall reach of the jaw to the size of the tire being worked upon.

If a clockwise motion be now imparted to the free outer end 91 of lever 40, lower jaw 44 will be lifted upwardly about pivotal connection 42, whereas the two-section or composite upper jaw 46 will be moved downwardly, whereby the upper and lower beads of the tire casing will be simultaneously compressed and freed from engagement with the flange of the rim of the tire. Spring 43 will effectively maintain the tip end 54 of lower jaw 44 in contact with the contour of the flange of the rim whereby engagement of the tip end of lower jaw 45 with the tire bead is maintained as the bead breaking operation progresses, as shown in Figure 2, thereby lessening the likelihood of damage to the tire casing incident to compression of the beads. Tip 80 of the upper jaw may be easily guided by hand to follow the contour of the flange engaged by the upper bead, said action being facilitated by the linkage arrangement illustrated in Fig. 2.

In the preferred embodiment of the invention, the axis of guide member 64 and the axis of the apertures of boss 70, designated generally by Y—Y is substantially parallel with an axis drawn thru tip 80 and pivot connection 47 of jaw 46, thru which points a line X—X has been passed. By reason of this construction, it is apparent that relative movement between sections 60 and 62 of two-piece jaw 46 will be such as to maintain tip 80 on line X—X throughout all reach settings, thereby effectively preserving the desired and necessary alignment of section 60 with reference to section 62.

It will likewise be observed that as soon as a turning moment is introduced between sections 60 and 62, section 60 will be locked relative to guide members 64 as a result of a bending moment or cocking of said apertures with reference to the guide members. Experience has conclusively demonstrated that sections 60 and 62 will be positively locked whereby to establish a definite reach of jaw 46 with reference to a tire engaged thereby.

A lowering of lever 40 will reverse the bead breaking sequence of jaws 44 and 46 thereby permitting the jaws to be swung circumferentially with reference to the tire for enabling the bead breaking operation to be repeated one or more times for properly and completely loosening the beads from the flanges of the rim.

As clearly disclosed in Fig. 2, jaw 46 will amply and adequately compress or space the upper bead from its adjacent flange for facilitating the insertion of a suitable tire tool, with which to pry the bead over the outer edge of the rim.

It should be understood that suitable means, such as a pin 90 may be provided thru the free outer end of guide members 64 for precluding accidental or unintentional disengagement of section 60 from said guide member.

With reference now to Fig. 2, it will be observed that the rim illustrated represents the largest rim receivable on support 14 whereas the rim outlined in broken lines and identified by the numeral 100 denotes the smallest wheel to be serviced by my device, it being further understood that said device is capable of handling wheels ranging from 12 to 18 inches in diameter without difficulty.

The contour of lower face 102 of jaw 44 is so proportioned with reference to the outer periphery of support 14 as to avoid contact therewith even when wheels of the smallest diameter are being worked upon.

It should likewise be observed that in those instances where for some reason it is desirable to loosen only the lower bead, lever 40 may be actuated for rendering jaw 44 operative while jaw 46 remains inoperative in the retracted or lowered position illustrated in the full lines of Fig. 1.

With particular reference to Fig. 1, it will be noted that I have provided an abutment 106 in jaw 44 which is engageable by the inner periphery of section 62 of jaw 46 when said jaw has been swung upwardly to the position indicated by the broken lines of Fig. 1. Further lifting of jaw 46 will result in lever 40 being moved in a clockwise direction about pivot 42 thru jaw 44 connected thereto as at 45, thereby automatically presenting actuating lever 40 to the operator incident to locating or positioning of jaw 46 with reference to the upper bead of the tire on wheel 25.

What is claimed is:

1. A device for breaking the bead of a pneumatic tire from the rim flange of a wheel, comprising a support for holding a wheel while a tire carried thereby is being worked upon, an actuating lever, means pivotally mounting the actuating lever upon said support at an axis residing adjacent one side of a wheel mounted upon said support, a pair of jaws pivotally mounted on said lever for working upon beads at opposite sides of the tire, the axes at which the jaws are mounted being located respectively at opposite sides of the axis at which the lever is pivotally mounted on said support means, the said jaws being dissimilar in size but both having generally concave sides facing the support when the jaws are respectively in engagement with a tire, the locus of movement of the pivotal axis of the smaller of said jaws, in response to actuation of said lever, being generally more remote from the tire than the locus of movement of the pivotal axis of the larger of said jaws, the smaller of said jaws being dimensioned to act upon the tire bead which is at the side of the tire nearest the axis upon which said lever is mounted, the larger of the jaws comprising two segments arranged in tandem to encircle a tire for acting upon portions thereof which are remote from the pivotal axis at which said lever is mounted, and means for adjustably spacing the two segments of said larger jaw to provide for its encirclement of tires of differing sizes.

2. A device for breaking the bead of a pneumatic tire from the rim flange of a wheel, comprising a support for holding a wheel while a tire carried thereby is being worked upon, an actuating lever, means for pivotally mounting the actuating lever upon said support at an axis residing at one side of a wheel mounted upon said support, a pair of jaws pivotally mounted on said lever at axes which are located respectively at opposite sides of the axis at which the lever is pivotally mounted, the said jaws being dissimilar in size but having curved tire engaging surfaces which face in the same direction when the jaws are in engagement with a tire, the smaller of the said jaws being dimensioned to act upon the tire bead which is at the side of the tire nearest the axis at which the said lever is mounted, the larger of the jaws comprising separable segments which, in assembly, are capable of encircling a tire to act upon portions thereof which are remote from the pivotal axis at which the said lever is mounted, and a friction lock for rigidly interconnecting the separable segments of the larger jaw in response to bead breaking pressure engagement of the larger jaw with the tire.

3. A device for breaking the bead of a pneumatic tire from the rim flange of a wheel, comprising a support for holding a wheel while a tire carried thereby is being worked upon, an actuating lever, means for pivotally mounting the actuating lever upon said support at an axis residing at one side of a wheel mounted upon said support, a pair of jaws pivotally mounted on said lever at axes which are located respectively at opposite sides of the axis at which the lever is pivotally mounted, the said jaws being dissimilar in size but having curved tire engaging surfaces which face in the same direction when the jaws are in engagement with a tire, the smaller of the said jaws being dimensioned to act upon the tire bead which is at the side of the tire nearest the axis at which the said lever is mounted, the larger of the jaws comprising separable segments which, in assembly, are capable of encircling a tire to act upon portions thereof which are remote from the pivotal axis at which the said lever is mounted, and means loosely interconnecting the said separable segments and providing a friction lock responsive to canting of one jaw segment with respect to the other for interlocking the jaw segments upon bead breaking pressure engagement of the larger jaw with the bead of a tire.

4. A device for breaking the bead of a pneumatic tire from the rim flange of a wheel, comprising a support for holding a wheel while a tire carried thereby is being worked upon, an actuating lever, means for pivotally mounting the actuating lever upon said support at an axis residing at one side of a wheel mounted upon said support, a pair of jaws pivotally mounted on said lever at axes which are located respectively at opposite sides of the axis at which the lever is pivotally mounted, the said jaws being dissimilar in size but having curved tire engaging surfaces which face in the same direction when the jaws are in engagement with a tire, the smaller of said jaws being dimensioned to act upon the tire bead which is at the side of the tire nearest the axis at which the said lever is mounted, the larger of the jaws being dimensioned to encircle the tire for acting upon a portion thereof which is remote from the pivotal axis at which the said lever is mounted, and one of said jaws having an abutment surface thereon which is engageable by a portion of the other of said jaws in response to independent pivotal movement of the latter for advancing the said lever to accessible position during encircling movement of the larger jaw into position about the tire.

ROBERT D. HENDERSON.

REFERENCES CITED

The following references are of record in the file of this patent:

UNITED STATES PATENTS

| Number | Name | Date |
|---|---|---|
| 650,077 | Hatten | May 22, 1901 |
| 783,058 | Michelin | Feb. 21, 1905 |
| 1,001,670 | Morris | Aug. 29, 1911 |
| 1,003,030 | Burt | Sept. 12, 1911 |
| 1,090,290 | Edington et al. | Mar. 17, 1914 |
| 1,217,777 | Kinsolying | Feb. 27, 1917 |
| 1,220,107 | Hartman | Mar. 20, 1917 |
| 1,255,773 | Morse | Feb. 5, 1918 |
| 1,646,511 | Weaver et al. | Oct. 25, 1927 |
| 1,650,674 | Weaver | Nov. 29, 1927 |
| 1,651,389 | Heineke | Dec. 6, 1927 |
| 1,966,766 | Raby et al. | July 17, 1934 |
| 2,212,768 | Bonneau | Aug. 27, 1940 |
| 2,333,880 | Ohlsen | Nov. 9, 1943 |
| 2,449,960 | Toles | Sept. 21, 1948 |
| 2,471,642 | Moltz | May 31, 1949 |